(12) United States Patent
Hagimoto

(10) Patent No.: US 9,188,046 B2
(45) Date of Patent: Nov. 17, 2015

(54) ABNORMALITY JUDGING SYSTEM FOR EXHAUST GAS PURIFICATION APPARATUS OF INTERNAL COMBUSTION ENGINE

(75) Inventor: Yuriko Hagimoto, Shizuoka-ken (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 14/395,587

(22) PCT Filed: Apr. 26, 2012

(86) PCT No.: PCT/JP2012/061210
§ 371 (c)(1),
(2), (4) Date: Oct. 20, 2014

(87) PCT Pub. No.: WO2013/161032
PCT Pub. Date: Oct. 31, 2013

(65) Prior Publication Data
US 2015/0093292 A1    Apr. 2, 2015

(51) Int. Cl.
*G01N 15/06*     (2006.01)
*G01N 33/00*     (2006.01)
*G01N 33/48*     (2006.01)
*F01N 11/00*     (2006.01)
*F01N 3/20*      (2006.01)

(52) U.S. Cl.
CPC ............ *F01N 11/007* (2013.01); *F01N 3/2066* (2013.01); *F01N 11/00* (2013.01); *F01N 11/002* (2013.01); *F01N 2550/00* (2013.01); *F01N 2550/02* (2013.01); *F01N 2560/026* (2013.01); *F01N 2610/02* (2013.01); *F01N 2900/1616* (2013.01); *Y02T 10/24* (2013.01); *Y02T 10/47* (2013.01)

(58) Field of Classification Search
USPC .......... 422/50, 83, 98; 73/1.02, 1.06; 436/43, 436/106, 116, 118, 149
See application file for complete search history.

(56) References Cited

U.S. PATENT DOCUMENTS

| | | | | | |
|---|---|---|---|---|---|
| 4,980,834 | A | * | 12/1990 | Ikeda et al. | 701/107 |
| 5,227,975 | A | * | 7/1993 | Nakaniwa | 701/103 |
| 5,392,600 | A | * | 2/1995 | Nagai | 60/274 |
| 5,445,015 | A | * | 8/1995 | Namiki et al. | 73/114.39 |
| 5,560,199 | A | * | 10/1996 | Agustin et al. | 60/274 |
| 2011/0131956 | A1 | | 6/2011 | Yasui et al. | |

FOREIGN PATENT DOCUMENTS

| JP | 2011-122492 | 6/2011 |
|---|---|---|
| JP | 2012-31826 | 2/2012 |

* cited by examiner

*Primary Examiner* — Brian J Sines
(74) *Attorney, Agent, or Firm* — Finnegan, Henderson, Farabow, Garrett & Dunner, LLP

(57) ABSTRACT

The abnormality of an $NH_3$ sensor is judged highly accurately. For this purpose, an abnormality judging system for an exhaust gas purification apparatus of an internal combustion engine comprises a selective catalytic reduction NOx catalyst which is provided at an exhaust gas passage of the internal combustion engine and which reduces NOx by using $NH_3$ as a reducing agent, a supply device which supplies the reducing agent from an upstream side from the NOx catalyst, a NOx sensor which detects NOx and $NH_3$ on a downstream side from the NOx catalyst, and an $NH_3$ sensor which detects $NH_3$ on a downstream side from the NOx catalyst, wherein it is judged that the $NH_3$ sensor has any abnormality if an absolute value of a difference between an estimated $NH_3$ concentration as a difference between a detection value of the NOx sensor and an estimated value of a NOx concentration and an $NH_3$ concentration detected by the $NH_3$ sensor is not less than a threshold value when $NH_3$ flows out from the selective catalytic reduction NOx catalyst.

6 Claims, 6 Drawing Sheets

TEMPERATURE OF AMMONIA OXIDATION CATALYST

TEMPERATURE OF AMMONIA OXIDATION CATALYST

ABNORMALITY JUDGING SYSTEM FOR EXHAUST GAS PURIFICATION APPARATUS OF INTERNAL COMBUSTION ENGINE

CROSS-REFERENCE TO RELATED APPLICATIONS

This application is a national phase application of International Application No. PCT/JP2012/061210, filed Apr. 26, 2012, the content of which is incorporated herein by reference.

TECHNICAL FIELD

The present invention relates to an abnormality judging system for an exhaust gas purification apparatus of an internal combustion engine.

BACKGROUND ART

A technique is known, in which a selective catalytic reduction NOx catalyst (hereinafter referred to as "SCR catalyst" as well) is arranged at an exhaust gas passage of an internal combustion engine. The SCR catalyst can adsorb $NH_3$ and reduce NOx by using $NH_3$.

In this context, a technique is known, in which a urea addition valve, an SCR catalyst, an ammonia oxidation catalyst, and a NOx sensor are provided successively in this order from the upstream side at an exhaust gas passage of an internal combustion engine to judge whether or not any abnormality arises in each of the SCR catalyst, the ammonia oxidation catalyst, the urea addition valve, and the NOx sensor (see, for example, Patent Document 1).

Further, a technique is known, in which the deterioration judgment is carried out for an SCR catalyst by using an $NH_3$ sensor (see, for example, Patent Document 2).

In the meantime, it is demanded to further reduce the amount of emission (discharge amount) of $NH_3$ to be emitted or discharged into the atmospheric air. In relation thereto, it is conceived that the supply amount of the reducing agent is controlled on the basis of the detection value of the $NH_3$ sensor. However, any abnormality may possibly arise in the $NH_3$ sensor. For this reason, it is also necessary to judge whether or not the $NH_3$ sensor is abnormal. The abnormality judgment for the $NH_3$ sensor has not been investigated so much until now, and hence there is room for investigation.

PRECEDING TECHNICAL DOCUMENTS

Patent Documents

Patent Document 1: JP2012-031826A;
Patent Document 2: JP2011-122492A.

SUMMARY OF THE INVENTION

Task to be Solved by the Invention

The present invention has been made taking the foregoing problem into consideration, an object of which is to judge the abnormality of an $NH_3$ sensor highly accurately.

Solution for the Task

In order to achieve the object as described above, according to the present invention, there is provided an abnormality judging system for an exhaust gas purification apparatus of an internal combustion engine, comprising:

a selective catalytic reduction NOx catalyst which is provided at an exhaust gas passage of the internal combustion engine and which reduces NOx by using $NH_3$ as a reducing agent;

a supply device which supplies the reducing agent to the selective catalytic reduction NOx catalyst from an upstream side from the selective catalytic reduction NOx catalyst;

a NOx sensor which is provided at the exhaust gas passage on a downstream side from the selective catalytic reduction NOx catalyst and which detects NOx and $NH_3$ contained in an exhaust gas; and an $NH_3$ sensor which is provided at the exhaust gas passage on the downstream side from the selective catalytic reduction NOx catalyst and which detects $NH_3$ contained in the exhaust gas;

the abnormality judging system for the exhaust gas purification apparatus of the internal combustion engine further comprising;

an estimating unit which estimates a NOx concentration in the exhaust gas allowed to pass through the NOx sensor without using a detection value of the NOx sensor; and a judging unit which judges that the $NH_3$ sensor has any abnormality if an absolute value of a difference between an estimated $NH_3$ concentration as a difference between the detection value of the NOx sensor and the NOx concentration estimated by the estimating unit and an $NH_3$ concentration detected by the $NH_3$ sensor is not less than a threshold value when $NH_3$ flows out from the selective catalytic reduction NOx catalyst.

The NOx sensor also detects $NH_3$ in addition to NOx. For this reason, it is impossible to distinguish NOx from $NH_3$ by using only the detection value of the NOx sensor. However, the NOx concentration in the exhaust gas allowed to pass through the NOx sensor can be estimated at a certain extent of accuracy. Therefore, the concentration of $NH_3$ can be estimated by subtracting the estimated NOx concentration from the detection value of the NOx sensor. On the other hand, the $NH_3$ sensor detects only $NH_3$. Further, if the $NH_3$ sensor is normal, it is expected that the difference is small between the $NH_3$ concentration estimated from the detection value of the NOx sensor and the detection value of the $NH_3$ sensor. Therefore, if the difference is large, it is possible to judge that the $NH_3$ sensor has any abnormality. That is, it is possible to judge that the $NH_3$ sensor has any abnormality if the absolute value of the difference between the estimated $NH_3$ concentration and the detection value of the $NH_3$ sensor is not less than the threshold value. The threshold value is the lower limit value of the absolute value of the difference between the estimated $NH_3$ concentration and the detection value of the $NH_3$ sensor when the $NH_3$ sensor has any abnormality.

It is also appropriate to previously judge whether or not the NOx sensor is normal by means of a well-known technique. Further, it is also appropriate that the supply device supplies $NH_3$ as the reducing agent. However, in place thereof, it is also appropriate that any substance (for example, urea), which is changeable to $NH_3$, is supplied. It is enough that the substance, which is supplied from the supply device, is finally converted into $NH_3$. Further, it is also appropriate that the estimating unit estimates the NOx concentration on the basis of, for example, the operation state of the internal combustion engine and the state of the SCR catalyst. Further, it is also appropriate that the NOx concentration is considered as the NOx amount, and the $NH_3$ concentration is considered as the $NH_3$ amount.

In the present invention, the system may further comprise:

an ammonia oxidation catalyst which is provided at the exhaust gas passage on the downstream side from the selective catalytic reduction NOx catalyst and on the upstream side from the NOx sensor and the $NH_3$ sensor and which oxidizes $NH_3$;

a temperature acquiring unit which acquires a temperature of the ammonia oxidation catalyst; and an exhaust gas flow rate acquiring unit which acquires an amount of the exhaust gas allowed to flow into the ammonia oxidation catalyst, wherein:

the judging unit can judge whether or not the $NH_3$ sensor has any abnormality under a condition in which NOx is not produced by the ammonia oxidation catalyst as determined on the basis of the temperature acquired by the temperature acquiring unit and the amount of the exhaust gas acquired by the exhaust gas flow rate acquiring unit.

In this context, as for the ammonia oxidation catalyst, $NH_3$ is changed to NOx in some cases. If $NH_3$ is changed to NOx, then the detection value of the NOx sensor is unchanged, but the detection value of the $NH_3$ sensor is decreased. Therefore, the accuracy to judge the abnormality of the $NH_3$ sensor may be lowered.

Further, whether or not $NH_3$ is changed to NOx by the ammonia oxidation catalyst relates to the temperature of the ammonia oxidation catalyst and the amount of the exhaust gas allowed to flow into the ammonia oxidation catalyst. That is, the condition, under which NOx is not produced by the ammonia oxidation catalyst, is determined on the basis of the temperature of the ammonia oxidation catalyst and the amount of the exhaust gas allowed to flow into the ammonia oxidation catalyst. It is possible to raise the judgment accuracy by judging the abnormality of the $NH_3$ sensor under this condition.

Further, in the present invention, the judging unit can judge whether or not the $NH_3$ sensor has any abnormality under a condition in which $NH_3$ flows out from the ammonia oxidation catalyst as determined on the basis of the temperature acquired by the temperature acquiring unit and the amount of the exhaust gas acquired by the exhaust gas flow rate acquiring unit.

That is, the judgment is made under the condition in which NOx is not produced by the ammonia oxidation catalyst and $NH_3$ flows out from the ammonia oxidation catalyst. In this context, if $NH_3$ is oxidized when $NH_3$ passes through the ammonia oxidation catalyst, then $NH_3$ may fail to arrive at the NOx sensor and the $NH_3$ sensor. If $NH_3$ does not arrive at the NOx sensor and the $NH_3$ sensor, it is impossible to judge the abnormality of the $NH_3$ sensor. In view of the above, the abnormality of the $NH_3$ sensor is judged when $NH_3$ arrives at the $NH_3$ sensor.

Whether or not $NH_3$ flows out from the ammonia oxidation catalyst relates to the temperature of the ammonia oxidation catalyst and the amount of the exhaust gas allowed to flow into the ammonia oxidation catalyst. That is, the condition, under which $NH_3$ flows out from the ammonia oxidation catalyst, is determined on the basis of the temperature of the ammonia oxidation catalyst and the amount of the exhaust gas allowed to flow into the ammonia oxidation catalyst. It is possible to further raise the judgment accuracy by judging the abnormality of the $NH_3$ sensor under this condition.

Further, in the present invention, the judging unit can judge whether or not the $NH_3$ sensor has any abnormality after an amount of the reducing agent supplied from the supply device is increased until $NH_3$ flows out from the ammonia oxidation catalyst if NOx is not produced by the ammonia oxidation catalyst and $NH_3$ does not flow out from the ammonia oxidation catalyst.

That is, if $NH_3$ does not flow out from the ammonia oxidation catalyst at the present point in time, it is impossible to judge the abnormality of the $NH_3$ sensor. On the contrary, if the amount of the reducing agent supplied from the supply device is increased to allow $NH_3$ to flow out from the ammonia oxidation catalyst when $NH_3$ does not flow out from the ammonia oxidation catalyst, it is possible to judge the abnormality of the $NH_3$ sensor. In this way, it is possible to widen the area in which the abnormality of the $NH_3$ sensor can be judged.

Further, in the present invention, the judging unit can judge whether or not the $NH_3$ sensor has any abnormality if the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on a boundary of whether or not NOx is produced by the ammonia oxidation catalyst.

The lower the temperature of the ammonia oxidation catalyst is, the larger the amount of the exhaust gas allowed to flow into the ammonia oxidation catalyst is, the more hardly NOx is produced by the ammonia oxidation catalyst. Whether or not NOx is produced by the ammonia oxidation catalyst is determined by the temperature of the ammonia oxidation catalyst and the amount of the exhaust gas allowed to flow into the ammonia oxidation catalyst. Therefore, the relationship is determined between the temperature of the ammonia oxidation catalyst and the amount of the exhaust gas allowed to flow into the ammonia oxidation catalyst, which is to be provided on the boundary of whether or not NOx is produced by the ammonia oxidation catalyst. Then, NOx is not produced by the ammonia oxidation catalyst if the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on the boundary of whether or not NOx is produced by the ammonia oxidation catalyst. When the abnormality of the $NH_3$ sensor is judged in this situation, it is thereby possible to further raise the judgment accuracy.

In place of the temperature acquired by the temperature acquiring unit and the amount of the exhaust gas acquired by the exhaust gas flow rate acquiring unit, it is also allowable that any other physical quantity, which is correlated therewith, is used.

Further, in the present invention, the judging unit can judge whether or not the $NH_3$ sensor has any abnormality if:

the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on a boundary of whether or not NOx is produced by the ammonia oxidation catalyst; and the temperature acquired by the temperature acquiring unit is low and the amount of the exhaust gas acquired by the exhaust gas flow rate acquiring unit is large as compared with temperature of the ammonia oxidation catalyst and the amount of the exhaust gas allowed to flow into the ammonia oxidation catalyst to be provided on a boundary of whether or not $NH_3$ flows out from the ammonia oxidation catalyst.

The lower the temperature of the ammonia oxidation catalyst is, the larger the amount of the exhaust gas allowed to flow into the ammonia oxidation catalyst is, the more easily $NH_3$ flows out from the ammonia oxidation catalyst. Whether or not $NH_3$ flows out from the ammonia oxidation catalyst is determined by the temperature of the ammonia oxidation catalyst and the amount of the exhaust gas allowed to flow into the ammonia oxidation catalyst. Therefore, the relationship is determined between the temperature of the ammonia oxidation catalyst and the amount of the exhaust gas allowed to flow into the ammonia oxidation catalyst, which is to be provided as the boundary of whether or not $NH_3$ flows out from the ammonia oxidation catalyst. Then, $NH_3$ flows out from the ammonia oxidation catalyst if the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on the boundary of whether or not $NH_3$ flows out from the ammonia oxidation catalyst.

On the other hand, NOx is not produced by the ammonia oxidation catalyst if the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on the boundary of whether or not NOx is produced by the ammonia oxidation catalyst. Then, it is possible to further raise the judgment accuracy by judging the abnormality of the $NH_3$ sensor when both of the condition under which NOx is not produced by the ammonia oxidation catalyst and the condition under which $NH_3$ flows out from the ammonia oxidation catalyst are fulfilled.

Effect of the Invention

According to the present invention, it is possible to judge the abnormality of the $NH_3$ sensor highly accurately.

MODE FOR CARRYING OUT THE INVENTION

An explanation will be made below on the basis of the drawings about a specified embodiment of the abnormality judging system for the exhaust gas purification apparatus of the internal combustion engine according to the present invention.

First Embodiment

Figure 1:
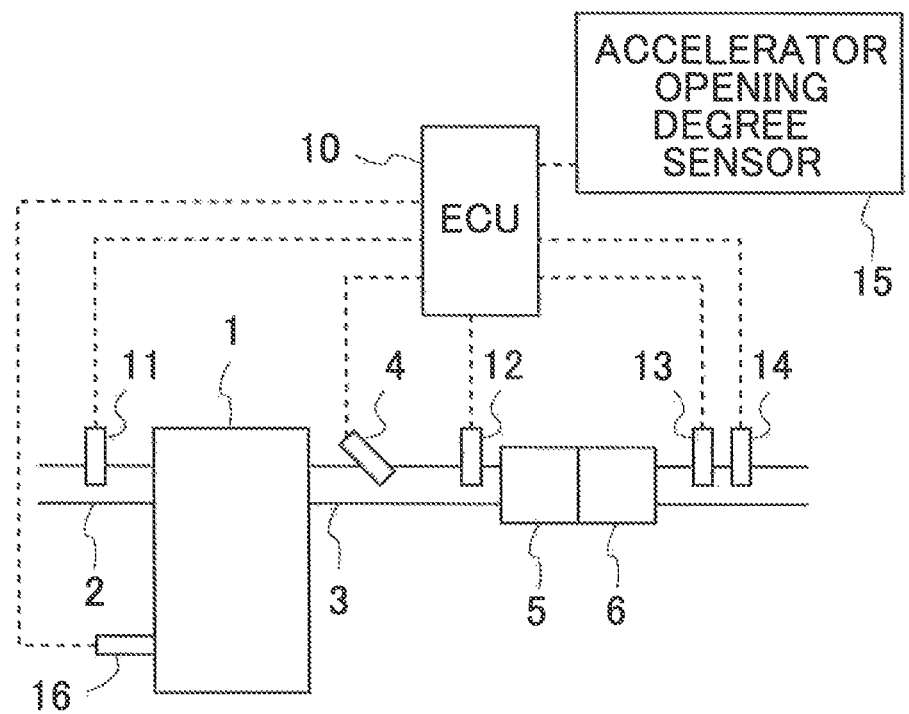
FIG. 1 shows a schematic arrangement of an abnormality judging system for an exhaust gas purification apparatus of an internal combustion engine according to an embodiment.

FIG. 1 shows a schematic arrangement of an abnormality judging system for an exhaust gas purification apparatus of an internal combustion engine according to an embodiment of the present invention. The internal combustion engine 1 shown in FIG. 1 may be either a diesel engine or a gasoline engine.

An intake gas passage 2 and an exhaust gas passage 3 are connected to the internal combustion engine 1. An air flow meter 11, which detects the amount of the intake gas allowed to flow through the intake gas passage 2, is provided for the intake gas passage 2. On the other hand, the exhaust gas passage 3 is provided with an injection valve 4, a selective catalytic reduction NOx catalyst 5 (hereinafter referred to as "SCR catalyst 5"), and an ammonia oxidation catalyst 6 in this order as referred to from the upstream side in the flow direction of the exhaust gas.

The injection valve 4 is opened when the reducing agent is injected, and the injection valve 4 is closed when the injection of the reducing agent is stopped. Ammonia ($NH_3$) is used for the reducing agent. The injection valve 4 may inject ammonia, or the injection valve 4 may inject an aqueous urea solution. The aqueous urea solution, which is injected from the injection valve 4, is hydrolyzed by the SCR catalyst 5 to produce ammonia which is adsorbed to the SCR catalyst 5. Obtained ammonia is utilized as the reducing agent in the SCR catalyst 5. That is, the substance to be changed to $NH_3$ or $NH_3$ is supplied from the injection valve 4. In this embodiment, the injection valve 4 corresponds to the supply device of the present invention.

The SCR catalyst 5 reduces NOx contained in the exhaust gas when the reducing agent is present. Therefore, when $NH_3$ is previously adsorbed as the reducing agent to the SCR catalyst 5, it is possible to reduce NOx with $NH_3$ by the aid of the SCR catalyst 5.

It is enough that the ammonia oxidation catalyst 6 is the catalyst having the oxidation capacity (oxidation ability). It is also allowable that the ammonia oxidation catalyst 6 is, for example, an oxidation catalyst or a three way catalyst. The ammonia oxidation catalyst 6 oxidizes $NH_3$ allowed to flow out from the SCR catalyst 5. In this embodiment, it is also allowable that the ammonia oxidation catalyst 6 is not provided.

An exhaust gas temperature sensor 12, which detects the temperature of the exhaust gas, is provided at the exhaust gas passage 3 on the upstream side from the SCR catalyst 5. The exhaust gas temperature sensor 12 detects the temperature of the exhaust gas allowed to flow into the SCR catalyst 5. Thus, it is possible to estimate the temperature of the SCR catalyst 5 or the ammonia oxidation catalyst 6 on the basis of the temperature of the exhaust gas. It is also allowable that a temperature sensor is attached on the downstream side from the SCR catalyst 5 or the ammonia oxidation catalyst 6 to detect the temperatures of the SCR catalyst 5 and the ammonia oxidation catalyst 6 by using the temperature sensor. Further, it is also possible to estimate the temperatures of the SCR catalyst 5 and the ammonia oxidation catalyst 6 on the basis of the operation state of the internal combustion engine 1. For example, the number of revolutions of the engine, the fuel injection amount, and the intake air amount are correlated with the temperatures of the SCR catalyst 5 and the ammonia oxidation catalyst 6. Therefore, it is also appropriate that the relationship (correlation) among them is previously determined, for example, by an experiment and the relationship is mapped.

Further, a NOx sensor 13 for detecting the NOx concentration in the exhaust gas and an $NH_3$ sensor 14 for detecting the $NH_3$ concentration in the exhaust gas are provided at the exhaust gas passage 3 on the downstream from the ammonia oxidation catalyst 6. The NOx sensor 13 similarly detects $NH_3$ as well in addition to NOx. That is, the detection value of the NOx sensor 13 is the value in which the NOx concentration and the $NH_3$ concentration are combined. On the other hand, the $NH_3$ sensor 14 detects only $NH_3$.

An oxidation catalyst and/or a particulate filter may be provided at the exhaust gas passage 3 on the upstream side from the injection valve 4.

The internal combustion engine 1 constructed as described above is provided in combination with ECU 10 which is an electronic control unit for controlling the internal combustion engine 1. ECU 10 controls the internal combustion engine 1 in accordance with the operation condition of the internal combustion engine 1 and the request of the driver.

In addition to the sensors described above, those connected to ECU 10 via the electric wirings include an accelerator opening degree sensor 15 which outputs the electric signal in accordance with the pedaling amount of an accelerator pedal and which is capable of detecting the engine load and a crank position sensor 16 which detects the number of revolutions of the engine. The output signals of the sensors are inputted into ECU 10. On the other hand, an injection valve 4 is connected to ECU 10 via the electric wiring, and the injection valve 4 is controlled by ECU 10.

Figure 2:
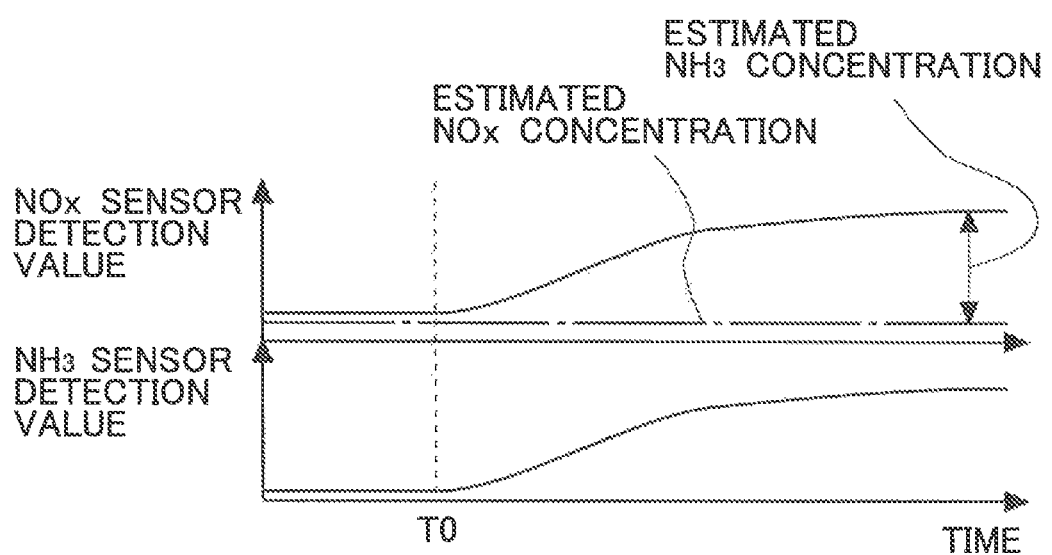
FIG. 2 shows relationships in relation to detection values of a NOx sensor and an $NH_3$ sensor.

Thus, ECU 10 judges the abnormality of the $NH_3$ sensor 14 by utilizing the detection value of the NOx sensor 13. When the abnormality of the $NH_3$ sensor 14 is judged, $NH_3$, which is in an amount larger than the amount of $NH_3$ maximally adsorbable by the SCR catalyst 5, is supplied so that $NH_3$ is detected by the NOx sensor 13 and the $NH_3$ sensor 14. That is, $NH_3$ is allowed to flow out from the SCR catalyst 5. In this context, FIG. 2 shows relationships in relation to the detection values of the NOx sensor 13 and the $NH_3$ sensor 14. The supply of $NH_3$ from the injection valve 4 is started at the point in time indicated by T0. In this situation, $NH_3$, which is in an amount larger than the amount of $NH_3$ maximally adsorbable by the SCR catalyst 5, is supplied.

The detection value of the NOx sensor 13 resides in the total value of the NOx concentration and the $NH_3$ concentration. When $NH_3$, which is in the amount larger than the amount of $NH_3$ maximally adsorbable by the SCR catalyst 5, is supplied, the $NH_3$ concentration is gradually raised. Therefore, the detection value of the NOx sensor 13 is raised correspondingly thereto. In the state, even when $NH_3$ is supplied, the NOx concentration in the exhaust gas is unchanged. On the other hand, only $NH_3$ is detected by the $NH_3$ sensor 13. Therefore, the detection value is also raised as the $NH_3$ concentration is raised.

The NOx concentration, which is provided on the downstream side from the ammonia oxidation catalyst 6, can be estimated. The value, which is obtained by estimating the NOx concentration to be provided on the downstream side from the ammonia oxidation catalyst 6, is hereinafter referred to as "estimated NOx concentration". The estimated NOx concentration is indicated by an alternate long and short dash line in relation to the "NOx sensor detection value" shown in FIG. 2. Then, it is possible to estimate the $NH_3$ concentration by subtracting the estimated NOx concentration from the detection value of the NOx sensor 13. That is, the detection value of the NOx sensor 13 is the total value of the $NH_3$ concentration and the NOx concentration. Therefore, if the detection value of the NOx sensor 13 and the estimated NOx concentration are known, it is possible to estimate the $NH_3$ concentration. The $NH_3$ concentration, which is estimated as described above, is hereinafter referred to as "estimated $NH_3$ concentration". In this embodiment, ECU 10, which calculates the estimated NOx concentration, corresponds to the estimating unit of the present invention.

Further, ECU 10 judges whether or not the $NH_3$ sensor 14 has any abnormality by comparing the estimated $NH_3$ concentration with the detection value of the $NH_3$ sensor 14.

The estimated $NH_3$ concentration is calculated on the basis of the estimated NOx concentration, and hence an error is included therein to a certain extent. However, if the absolute value of the difference between the estimated $NH_3$ concentration and the detection value of the $NH_3$ sensor 14 is larger than the error, it is considered that the $NH_3$ sensor 14 has any abnormality. In this way, ECU 10 judges whether or not the $NH_3$ sensor 14 has any abnormality.

Figure 3:
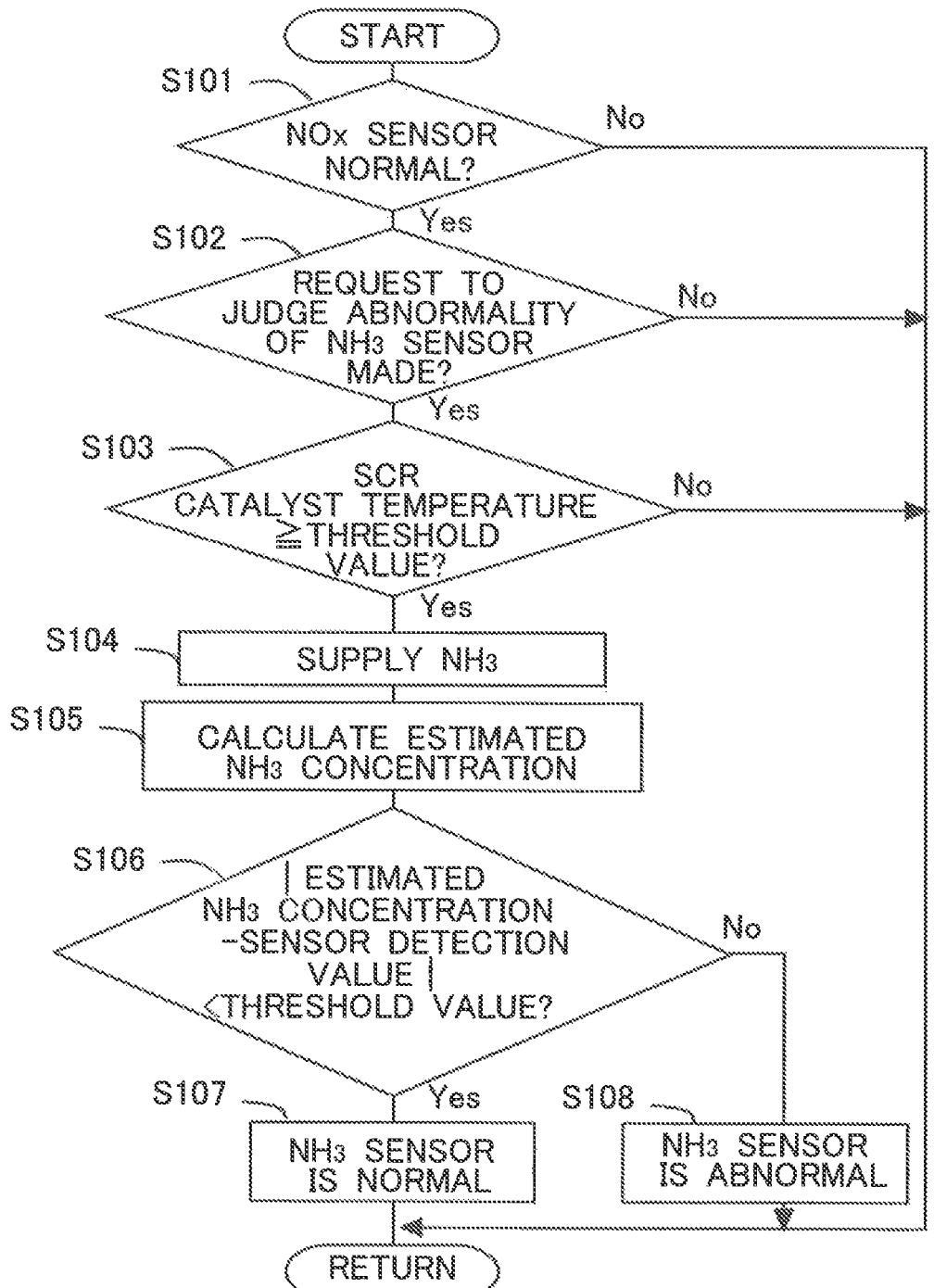
FIG. 3 shows a flow chart illustrating a flow to judge the abnormality of the $NH_3$ sensor according to a first embodiment.

FIG. 3 shows a flow chart illustrating a flow to judge the abnormality of the $NH_3$ sensor 14 according to this embodiment. This routine is executed by ECU 10 every time when a predetermined time elapses.

In Step S101, it is judged whether or not the NOx sensor 13 is normal. The detection value of the NOx sensor 13 is utilized when the abnormality of the $NH_3$ sensor 14 is judged. Therefore, if the NOx sensor 13 is not normal, it is impossible to perform any correct judgment. For this reason, it is necessary that the NOx sensor 13 is normal. In this step, it is possible to judge whether or not the NOx sensor 13 is normal by utilizing a well-known technique. Further, it is also appropriate to confirm the fact that no abnormality exists in any device other than the $NH_3$ sensor 14 by utilizing a well-known technique beforehand. If the affirmative judgment is made in Step S101, the routine proceeds to Step S102. On the other hand, if the negative judgment is made, this routine is completed.

In Step S102, it is judged whether or not any request to judge the abnormality of the $NH_3$ sensor 14 is made. The request to judge the abnormality of the $NH_3$ sensor 14 is made when the necessity to judge the abnormality of the $NH_3$ sensor 14 arises. For example, it is also appropriate that the request to judge the abnormality of the $NH_3$ sensor 14 is made every time when a predetermined time elapses. Alternatively, it is also appropriate that the request to judge the abnormality of the $NH_3$ sensor 14 is made every time when the internal combustion engine 1 is started. If the affirmative judgment is made in Step S102, the routine proceeds to Step S103. On the other hand, if the negative judgment is made, this routine is completed.

In Step S103, it is judged whether or not the temperature of the SCR catalyst 5 is not less than a threshold value. In this step, it is judged whether or not the temperature of the SCR catalyst 5 arrives at the active temperature. That is, the threshold value is the lower limit value of the active temperature of the SCR catalyst 5. The threshold value can be previously determined, for example, by an experiment. In this case, if the temperature of the SCR catalyst 5 arrives at the active temperature, it is easy to estimate the NOx amount to be purified by the SCR catalyst 5. That is, it is easy to estimate the amount of decrease of the NOx concentration brought about by the SCR catalyst 5. Therefore, it is possible to easily estimate the NOx concentration in the exhaust gas allowed to flow out from the SCR catalyst 5. Therefore, it is possible to determine the estimated NOx concentration highly accurately. It is also allowable that this step is omitted provided that the NOx amount or the NOx concentration in the exhaust gas allowed to flow out from the SCR catalyst 5 can be estimated. Further, it is also appropriate that the temperature of the SCR catalyst 5 is raised to the threshold value if the temperature of the SCR catalyst 5 is not the temperature which is not less than the threshold value. For example, the temperature of the SCR catalyst 5 may be raised by raising the temperature of the exhaust gas. Alternatively, the SCR catalyst 5 may be heated by using, for example, a heater.

The temperature of the SCR catalyst 5 can be determined on the basis of the detection value of the exhaust gas temperature sensor 12. Further, it is also appropriate that the sensor is directly attached to the SCR catalyst 5 to detect the temperature of the SCR catalyst 5. Further, the temperature of the SCR catalyst 5 is changed depending on the operation state of the internal combustion engine 1. Therefore, it is also appropriate that the temperature of the SCR catalyst 5 is estimated on the basis of the operation state of the internal combustion engine 1. For example, the following procedure is preferably adopted. That is, the relationship between the temperature of the SCR catalyst 5 and the number of revolutions of the engine, the fuel supply amount to the internal combustion engine 1, and the intake air amount is determined, for example, by an experiment and mapped beforehand, and the relationship is stored in ECU 10 beforehand. If the affirmative judgment is made in Step S103, the routine proceeds to Step S104. On the other hand, if the negative judgment is made, this routine is completed.

In Step S104, $NH_3$ is supplied from the injection valve 4. In this situation, $NH_3$ is supplied so that $NH_3$ flows out from the SCR catalyst 5. Therefore, $NH_3$, which is in an amount larger than the amount of $NH_3$ required to reduce NOx, is supplied.

In this case, if NOx is reduced, it is appropriate that $NH_3$ is supplied from the injection valve 4 so that $NH_3$, which is consumed to reduce NOx, is supplemented. That is, $NH_3$ is usually supplied from the injection valve 4 so that $NH_3$ does not flow out from the SCR catalyst 5. On the other hand, when the abnormality of the $NH_3$ sensor 14 is judged, $NH_3$, which is in an amount larger than the amount of consumption of $NH_3$ consumed by the SCR catalyst 5, is supplied. For example, it is also appropriate that $NH_3$, which is in an amount larger than the amount of $NH_3$ required to reduce NOx by a regulated amount (prescribed amount), is supplied.

The amount of consumption of $NH_3$ consumed by the SCR catalyst 5 is correlated with the NOx amount emitted or discharged from the internal combustion engine 1. Therefore, the amount of consumption of $NH_3$ can be calculated on the basis of the operation state of the internal combustion engine 1. The NOx amount discharged from the internal combustion engine 1 is correlated, for example, with the intake air amount of the internal combustion engine 1 and the fuel amount supplied to the internal combustion engine 1. If the relationship (correlation) is determined, for example, by an experiment and mapped beforehand, the NOx amount discharged from the internal combustion engine 1 can be calculated from the intake air amount of the internal combustion engine 1 and the fuel amount supplied to the internal combustion engine 1. The intake air amount of the internal combustion engine 1 is the detection value of the air flow meter 11. Further, it is ECU 10 that calculates the fuel amount supplied to the internal combustion engine 1. Therefore, it is possible to use the fuel amount stored in ECU 10. Then, if the process in Step S104 is completed, the routine proceeds to Step S105.

In Step S105, the estimated $NH_3$ concentration is calculated. The estimated $NH_3$ concentration is calculated by subtracting the estimated NOx concentration from the detection value of the NOx sensor 13 obtained at the present point in time.

In this procedure, the estimated NOx concentration is obtained by subtracting the amount corresponding to the decrease of the NOx concentration to be purified by the SCR catalyst 5 from the NOx concentration in the gas emitted or discharged from the internal combustion engine 1. The NOx concentration in the gas discharged from the internal combustion engine 1 is correlated with the intake air amount of the internal combustion engine 1 and the fuel amount supplied to the internal combustion engine 1. If the relationship (correlation) is determined, for example, by an experiment and mapped beforehand, the NOx concentration in the gas discharged from the internal combustion engine 1 can be calculated from the intake air amount of the internal combustion engine 1 and the fuel amount supplied to the internal combustion engine 1.

Further, the NOx concentration, which is lowered by being purified by the SCR catalyst 5, is correlated with the temperature of the SCR catalyst 5 and the intake air amount of the internal combustion engine 1. Therefore, if the relationship (correlation) is determined, for example, by an experiment and mapped beforehand, the NOx concentration, which is lowered by being purified by the SCR catalyst 5, can be calculated from the temperature of the SCR catalyst 5 and the intake air amount of the internal combustion engine 1. Then, if the process in Step S105 is completed, the routine proceeds to Step S106.

In Step S106, it is judged whether or not the absolute value of the difference between the estimated NOx concentration and the detection value of the $NH_3$ sensor 14 is less than a threshold value. The threshold value is the lower limit value of the absolute value of the difference between the estimated NOx concentration and the detection value of the $NH_3$ sensor 14 when the $NH_3$ sensor 14 has any abnormality. The threshold value is previously determined, for example, by an experiment.

If the affirmative judgment is made in Step S106, then the routine proceeds to Step S107, and it is judged that the $NH_3$ sensor 14 is normal. On the other hand, if the negative judgment is made in Step S106, then the routine proceeds to Step S108, and it is judged that the $NH_3$ sensor 14 is abnormal.

It is also appropriate that the deterioration judgment is carried out for the ammonia oxidation catalyst 6 by utilizing the detection value of the $NH_3$ sensor 14 after it is judged that the $NH_3$ sensor 14 is normal. In this embodiment, ECU 10, which processes Steps S106, S107, S108, corresponds to the judging unit of the present invention.

As explained above, according to this embodiment, it is possible to judge whether or not the $NH_3$ sensor 14 is abnormal by utilizing the detection value of the NOx sensor 13 and the estimated NOx concentration.

Second Embodiment

In this embodiment, the condition, under which the abnormality of the $NH_3$ sensor 14 is judged, is different from that of the first embodiment. For example, other apparatuses and devices are the same as those of the first embodiment, any explanation of which will be omitted.

Even when $NH_3$ is supplied from the injection valve 4 to allow $NH_3$ to flow out from the SCR catalyst 5, if the ammonia oxidation catalyst 6 is provided, then $NH_3$ may be oxidized by the ammonia oxidation catalyst 6. That is, $NH_3$ does not arrive at the NOx sensor 13 and the $NH_3$ sensor 14 in some cases. Therefore, it is feared that the abnormality of the $NH_3$ sensor 14 cannot be judged. In view of the above, in this embodiment, the abnormality of the $NH_3$ sensor 14 is judged under a condition in which $NH_3$ flows out from the ammonia oxidation catalyst 6.

In this context, the larger the intake air amount of the internal combustion engine 1 is, the larger the amount of the exhaust gas allowed to pass through the ammonia oxidation catalyst 6 per unit time is. Therefore, $NH_3$ is hardly reacted in the ammonia oxidation catalyst 6, and hence $NH_3$ easily passes through the ammonia oxidation catalyst 6. Further, if the temperature of the ammonia oxidation catalyst 6 is lowered, then $NH_3$ is hardly reacted in the ammonia oxidation catalyst 6, and hence $NH_3$ easily passes through the ammonia oxidation catalyst 6. Even when $NH_3$ does not flow out from the ammonia oxidation catalyst 6 at the present point in time, it is possible to allow $NH_3$ to flow out from the ammonia oxidation catalyst 6 by increasing the supply amount of $NH_3$ supplied from the injection valve 4.

Further, when the temperature of the ammonia oxidation catalyst 6 is raised, $NH_3$ is changed to NOx in the ammonia oxidation catalyst 6. Further, the larger the intake air amount of the internal combustion engine 1 is, the larger the amount of the exhaust gas allowed to flow into the ammonia oxidation catalyst 6 per unit time is. Therefore, $NH_3$ is hardly reacted in the ammonia oxidation catalyst 6. For this reason, the larger the intake air amount of the internal combustion engine 1 is, the more hardly $NH_3$ is changed to NOx.

Even when $NH_3$ is changed to NOx, then the detection value of the NOx sensor 13 is not changed, but the detection value of the $NH_3$ sensor 14 is decreased. The accuracy of the abnormality judgment is lowered on account of the decrease in the detection value of the $NH_3$ sensor 14. Accordingly, in this embodiment, the abnormality of the $NH_3$ sensor 14 is judged under the condition in which $NH_3$ is not changed to NOx by the ammonia oxidation catalyst 6. The intake air amount of the internal combustion engine 1 and the amount of the exhaust gas allowed to flow into the ammonia oxidation catalyst 6 are correlated with each other. Therefore, it is possible to calculate the amount of the exhaust gas allowed to flow into the ammonia oxidation catalyst 6 on the basis of the intake air amount of the internal combustion engine 1. In this embodiment, ECU 10, which calculates the amount of the exhaust gas allowed to flow into the ammonia oxidation catalyst 6 on the basis of the intake air amount of the internal combustion engine 1, corresponds to the exhaust gas flow rate acquiring unit of the present invention. It is also possible to determine the condition under which the abnormality of the $NH_3$ sensor 14 is judged on the basis of the intake air amount of the internal combustion engine 1 without determining the amount of the exhaust gas allowed to flow into the ammonia oxidation catalyst 6. Therefore, in the following description, the condition is determined, under which the abnormality of the $NH_3$ sensor 14 is judged on the basis of the intake air amount of the internal combustion engine 1, without determining the amount of the exhaust gas allowed to flow into the ammonia oxidation catalyst 6. It is also possible to replace the intake air amount of the internal combustion engine 1 with the amount of the exhaust gas allowed to flow into the ammonia oxidation catalyst 6.

Figure 4:
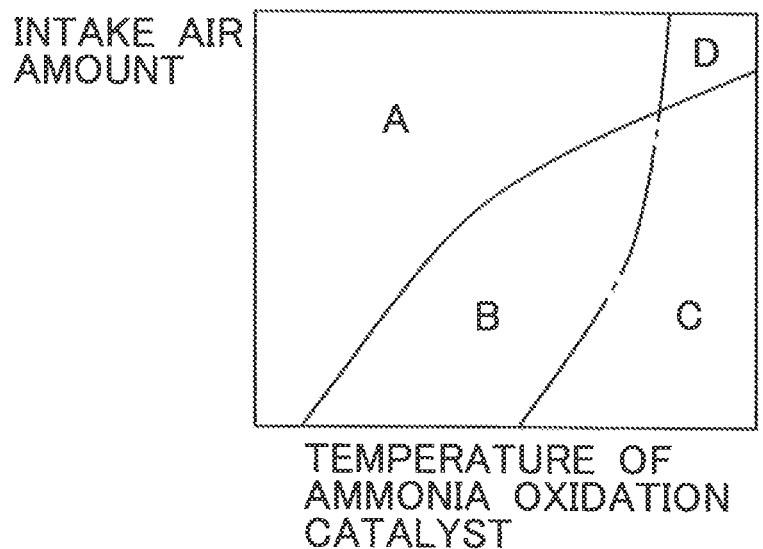
FIG. 4 shows a relationship between the temperature of an ammonia oxidation catalyst and the intake air amount of the internal combustion engine.

In this context, FIG. 4 shows a relationship between the temperature of the ammonia oxidation catalyst 6 and the intake air amount of the internal combustion engine 1. With reference to FIG. 4, the solid line indicates the boundary of whether or not $NH_3$ passes through the ammonia oxidation catalyst 6. If the intake air amount is larger than that indicated by the solid line, or if the temperature of the ammonia oxidation catalyst 6 is lower than that indicated by the solid line, then $NH_3$ passes through the ammonia oxidation catalyst 6. That is, with reference to FIG. 4, $NH_3$ passes through the ammonia oxidation catalyst 6 in the areas indicated by A and D.

Further, in FIG. 4, the alternate long and short dash line indicates the boundary of whether or not $NH_3$ is changed to NOx by the ammonia oxidation catalyst 6. If the intake air amount is larger than that indicated by the alternate long and short dash line, or if the temperature of the ammonia oxidation catalyst 6 is lower than that indicated by the alternate long and short dash line, then $NH_3$ is not changed to NOx. That is, $NH_3$ is not changed to NOx in the areas indicated by A and B in FIG. 4.

Figure 5:
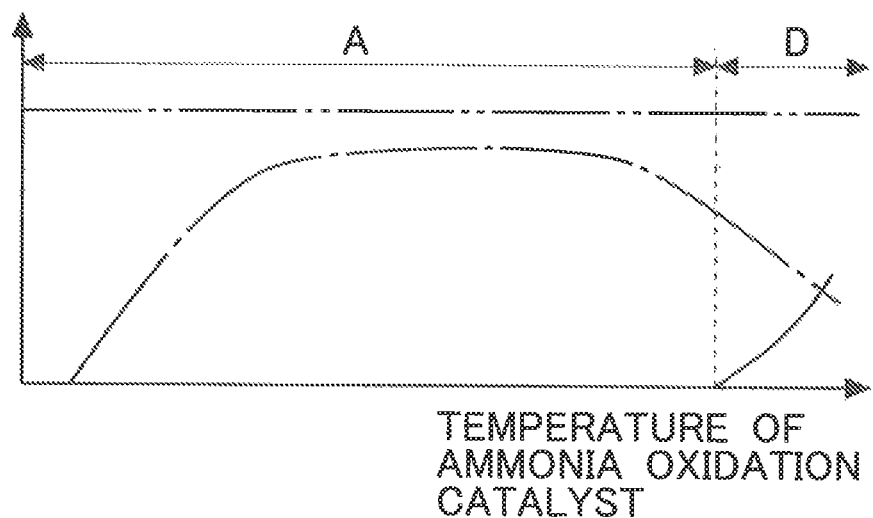
FIG. 5 shows a relationship among the temperature of the ammonia oxidation catalyst, the $NH_3$ amount allowed to flow into the ammonia oxidation catalyst, the $NH_3$ amount capable of being purified by the ammonia oxidation catalyst, and the NOx amount produced by the ammonia oxidation catalyst when the intake air amount of the internal combustion engine is relatively large.
Figure 6:
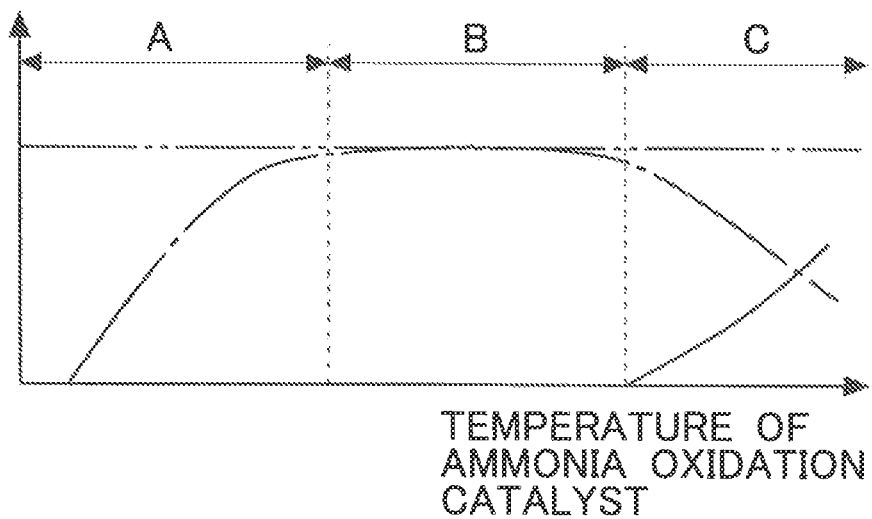
FIG. 6 shows a relationship among the temperature of the ammonia oxidation catalyst, the $NH_3$ amount allowed to flow into the ammonia oxidation catalyst, the $NH_3$ amount capable of being purified by the ammonia oxidation catalyst, and the NOx amount produced by the ammonia oxidation catalyst when the intake air amount of the internal combustion engine is moderate.
Figure 7:
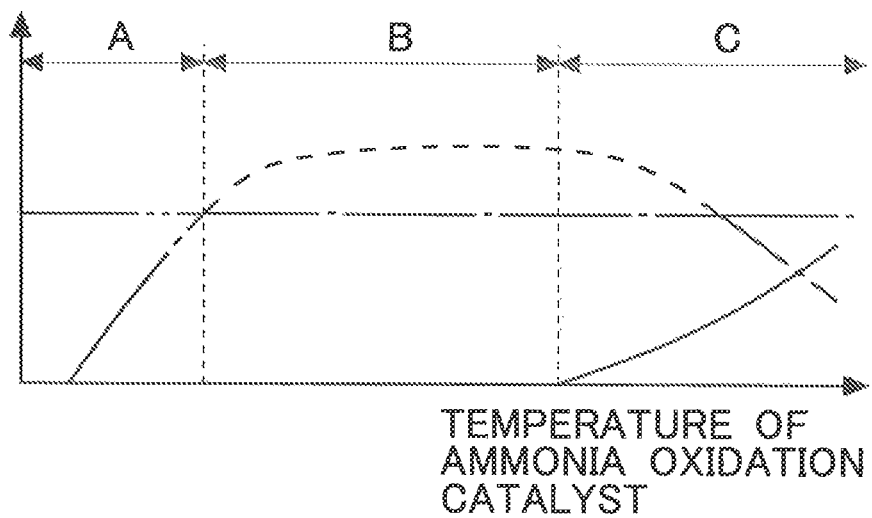
FIG. 7 shows a relationship among the temperature of the ammonia oxidation catalyst, the $NH_3$ amount allowed to flow into the ammonia oxidation catalyst, the $NH_3$ amount capable of being purified by the ammonia oxidation catalyst, and the NOx amount produced by the ammonia oxidation catalyst when the intake air amount of the internal combustion engine is relatively small.

In the next place, FIGS. 5, 6, and 7 show relationships among the temperature of the ammonia oxidation catalyst 6, the $NH_3$ amount allowed to flow into the ammonia oxidation catalyst 6, the $NH_3$ amount purified by the ammonia oxidation catalyst 6, and the NOx amount produced by the ammonia oxidation catalyst 6. The $NH_3$ amount purified by the ammonia oxidation catalyst 6 is the $NH_3$ amount in which $NH_3$ is changed to $N_2$ by the ammonia oxidation catalyst 6.

FIG. 5 shows a situation in which the intake air amount of the internal combustion engine 1 is relatively large, FIG. 6 shows a situation in which the intake air amount of the internal combustion engine 1 is moderate, and FIG. 7 shows a situation in which the intake air amount of the internal combustion engine 1 is relatively small. In FIGS. 5, 6, and 7, the two-dot chain line indicates the $NH_3$ amount allowed to flow into the ammonia oxidation catalyst 6, the alternate long and short dash line indicates the $NH_3$ amount purified by the ammonia oxidation catalyst 6, and the solid line indicates the NOx amount produced by the ammonia oxidation catalyst 6. Further, in FIGS. 5, 6, and 7, A, B, C, D correspond to the areas of A, B, C, D shown in FIG. 4.

As shown in FIG. 5, when the intake air amount of the internal combustion engine 1 is relatively large, the $NH_3$ amount allowed to flow into the ammonia oxidation catalyst 6 is increased. Therefore, the $NH_3$ amount allowed to flow into the ammonia oxidation catalyst 6 is larger than the $NH_3$ amount purified by the ammonia oxidation catalyst 6 in the entire area of the temperature of the ammonia oxidation catalyst 6. Therefore, the ammonia oxidation catalyst 6 cannot fully purify $NH_3$, and hence $NH_3$ flows out to the downstream. Further, in the area indicated by D, the oxidation ability to oxidize $NH_3$ is lowered in the ammonia oxidation catalyst 6, and NOx, which is in the state provided before $NH_3$ is changed to $N_2$, is emitted or discharged.

Further, as shown in FIG. 6, when the intake air amount of the internal combustion engine 1 is moderate, the $NH_3$ amount allowed to flow into the ammonia oxidation catalyst 6 is decreased as compared with when the intake air amount of the internal combustion engine 1 is relatively large. Therefore, in the area indicated by B, the $NH_3$ amount allowed to flow into the ammonia oxidation catalyst 6 is approximately the same as the $NH_3$ amount purified by the ammonia oxidation catalyst 6. Therefore, $NH_3$ does not flow out from the ammonia oxidation catalyst 6. Further, in the area indicated by C, $NH_3$ does not flow out from the ammonia oxidation catalyst 6, but the amount of production of NOx is increased.

Further, as shown in FIG. 7, when the intake air amount of the internal combustion engine 1 is relatively small, the $NH_3$ amount allowed to flow into the ammonia oxidation catalyst 6 is decreased as compared with when the intake air amount of the internal combustion engine 1 is moderate. Therefore, in the area indicated by B, the $NH_3$ amount capable of being purified by the ammonia oxidation catalyst 6 is larger than the $NH_3$ amount allowed to flow into the ammonia oxidation catalyst 6, and hence $NH_3$ does not flow out from the ammonia oxidation catalyst 6. Further, the area indicated by C is expanded to the side on which the temperature of the ammonia oxidation catalyst 6 is lower. That is, the temperature area, in which NOx is produced, is widened.

In the area indicated by A in FIG. 4, $NH_3$ passes through the ammonia oxidation catalyst 6, and $NH_3$ is not changed to NOx. Therefore, it is appropriate to judge the abnormality of the $NH_3$ sensor 14 in the area of A shown in FIG. 4. Further, even in the area indicated by B in FIG. 4, $NH_3$ passes through the ammonia oxidation catalyst 6 by increasing the supply amount of $NH_3$. Therefore, it is possible to judge the abnormality of the $NH_3$ sensor 14. In other words, it is possible to widen the area in which the abnormality of the $NH_3$ sensor 14 can be judged, by increasing the supply amount of $NH_3$. Usually, the internal combustion engine 1 enters the area of A or B shown in FIG. 4 at least once during the period ranging from the start-up to the stop of the internal combustion engine 1. Therefore, the opportunity to judge the abnormality of the $NH_3$ sensor 14 is secured.

Figure 8:
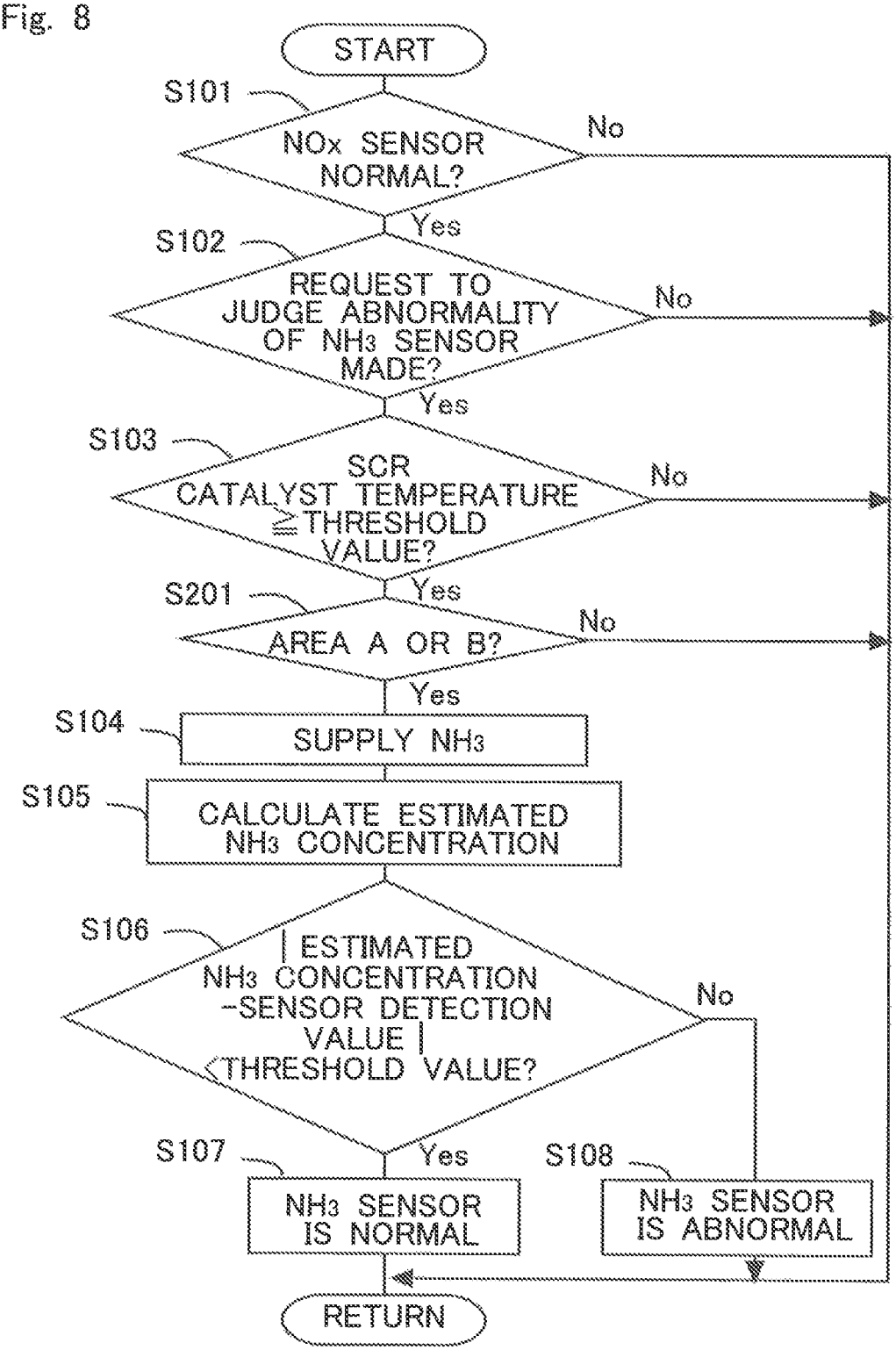
FIG. 8 shows a flow chart illustrating a flow to judge the abnormality of an $NH_3$ sensor according to a second embodiment.

FIG. 8 shows a flow chart illustrating a flow to judge the abnormality of the $NH_3$ sensor 14 according to this embodiment. This routine is executed by ECU 10 every time when a predetermined time elapses. Only Step S201 differs as compared with the flow chart shown in FIG. 3. Therefore, only Step S201 will be explained.

If the affirmative judgment is made in Step S103, the routine proceeds to Step S201. In Step S201, it is judged whether or not the intake air amount of the internal combustion engine 1 and the temperature of the ammonia oxidation catalyst 6 are in the area indicated by A or B in FIG. 4. That is, it is judged whether or not the internal combustion engine 1 is in the area in which NOx is not produced by at least the ammonia oxidation catalyst 6. In this step, it is also allowable to judge whether or not the intake air amount of the internal combustion engine 1 and the temperature of the ammonia oxidation catalyst 6 are in the area indicated by A in FIG. 4. In other words, it is also allowable to judge whether or not the internal combustion engine 1 is in the area in which NOx is not produced by the ammonia oxidation catalyst 6 and $NH_3$ flows out from the ammonia oxidation catalyst 6. The temperature of the ammonia oxidation catalyst 6 may be obtained on the basis of the exhaust gas temperature sensor 12, or the temperature of the ammonia oxidation catalyst 6 may be estimated on the basis of the operation state of the internal combustion engine 1. In this embodiment, the exhaust gas temperature sensor 12 or ECU 10 which estimates the temperature of the ammonia oxidation catalyst 6 on the basis of the operation state of the internal combustion engine 1 corresponds to the temperature acquiring unit of the present invention.

In the area indicated by A in FIG. 4, $NH_3$ already flows out from the ammonia oxidation catalyst 6. Therefore, it is enough to keep the supply amount of the reducing agent to a minimum. However, if the frequency to enter the area indicated by A in FIG. 4 is small, the frequency of the abnormality judgment is decreased for the $NH_3$ sensor 14 in some cases. In such a situation, it is also allowable that the abnormality judgment is carried out for the $NH_3$ sensor 14 while making expansion to the area indicated by B. Therefore, it is also allowable to judge the abnormality of the $NH_3$ sensor 14 only in the area indicated by A depending on the frequency of the abnormality judgment for the $NH_3$ sensor 14.

If the affirmative judgment is made in Step S201, the routine proceeds to Step S104. On the other hand, if the negative judgment is made, this routine is completed.

It is also allowable that the deterioration judgment is carried out for the ammonia oxidation catalyst 6 by utilizing the detection value of the $NH_3$ sensor 14 after it is judged that the $NH_3$ sensor 14 is normal. In this procedure, when the ammonia oxidation catalyst 6 is provided, the $NH_3$ amount and the NOx amount, which arrive at the NOx sensor 13 and the $NH_3$ sensor 14, are changed depending on the degree of the deterioration of the ammonia oxidation catalyst 6. Therefore, the accuracy to judge the abnormality of the $NH_3$ sensor 14 may be changed depending on the degree of the deterioration of the ammonia oxidation catalyst 6. However, in this embodiment, the abnormality of the $NH_3$ sensor 14 is judged under the condition in which $NH_3$ flows out from the ammonia oxidation catalyst 6 and NOx is not produced by the ammonia oxidation catalyst 6. Therefore, the influence of the deterioration of the ammonia oxidation catalyst 6 is hardly exerted. That is, it is possible to judge the abnormality of the $NH_3$ sensor 14 highly accurately irrelevant to the degree of the deterioration of the ammonia oxidation catalyst 6. Thus, it is possible to carry out the deterioration judgment for the ammonia oxidation catalyst 6 by utilizing the detection value of the $NH_3$ sensor 14 after it is judged that the $NH_3$ sensor 14 is normal.

As explained above, according to this embodiment, it is judged whether or not the $NH_3$ sensor 14 is abnormal while considering the intake air amount of the internal combustion engine 1, i.e., the amount of the exhaust gas allowed to flow into the ammonia oxidation catalyst 6 and the temperature of the ammonia oxidation catalyst 6. Therefore, it is possible to raise the judgment accuracy.

PARTS LIST

1: internal combustion engine, 2: intake gas passage, 3: exhaust gas passage, 4: injection valve, 5: selective catalytic reduction NOx catalyst (SCR catalyst), 6: ammonia oxidation catalyst, 10: ECU, 11: air flow meter, 12: exhaust gas temperature sensor, 13: NOx sensor, 14: $NH_3$ sensor, 15: accelerator opening degree sensor, 16: crank position sensor.

The invention claimed is:
1. An abnormality judging system for an exhaust gas purification apparatus of an internal combustion engine, comprising:
   a selective catalytic reduction NOx catalyst which is provided at an exhaust gas passage of the internal combustion engine and which reduces NOx by using $NH_3$ as a reducing agent;

a supply device which supplies the reducing agent to the selective catalytic reduction NOx catalyst from an upstream side from the selective catalytic reduction NOx catalyst;

a NOx sensor which is provided at the exhaust gas passage on a downstream side from the selective catalytic reduction NOx catalyst and which detects NOx and $NH_3$ contained in an exhaust gas; and an $NH_3$ sensor which is provided at the exhaust gas passage on the downstream side from the selective catalytic reduction NOx catalyst and which detects $NH_3$ contained in the exhaust gas;

the abnormality judging system for the exhaust gas purification apparatus of the internal combustion engine further comprising;

an estimating unit which estimates a NOx concentration in the exhaust gas allowed to pass through the NOx sensor without using a detection value of the NOx sensor; and a judging unit which judges that the $NH_3$ sensor has any abnormality if an absolute value of a difference between an estimated $NH_3$ concentration as a difference between the detection value of the NOx sensor and the NOx concentration estimated by the estimating unit and an $NH_3$ concentration detected by the $NH_3$ sensor is not less than a threshold value when $NH_3$ flows out from the selective catalytic reduction NOx catalyst.

2. The abnormality judging system for the exhaust gas purification apparatus of the internal combustion engine according to claim 1, further comprising:

an ammonia oxidation catalyst which is provided at the exhaust gas passage on the downstream side from the selective catalytic reduction NOx catalyst and on the upstream side from the NOx sensor and the $NH_3$ sensor and which oxidizes $NH_3$;

a temperature acquiring unit which acquires a temperature of the ammonia oxidation catalyst; and an exhaust gas flow rate acquiring unit which acquires an amount of the exhaust gas allowed to flow into the ammonia oxidation catalyst, wherein:

the judging unit judges whether or not the $NH_3$ sensor has any abnormality under a condition in which NOx is not produced by the ammonia oxidation catalyst as determined on the basis of the temperature acquired by the temperature acquiring unit and the amount of the exhaust gas acquired by the exhaust gas flow rate acquiring unit.

3. The abnormality judging system for the exhaust gas purification apparatus of the internal combustion engine according to claim 2, wherein the judging unit judges whether or not the $NH_3$ sensor has any abnormality under a condition in which $NH_3$ flows out from the ammonia oxidation catalyst as determined on the basis of the temperature acquired by the temperature acquiring unit and the amount of the exhaust gas acquired by the exhaust gas flow rate acquiring unit.

4. The abnormality judging system for the exhaust gas purification apparatus of the internal combustion engine according to claim 3, wherein the judging unit judges whether or not the $NH_3$ sensor has any abnormality after an amount of the reducing agent supplied from the supply device is increased until $NH_3$ flows out from the ammonia oxidation catalyst if NOx is not produced by the ammonia oxidation catalyst and $NH_3$ does not flow out from the ammonia oxidation catalyst.

5. The abnormality judging system for the exhaust gas purification apparatus of the internal combustion engine according to claim 2, wherein the judging unit judges whether or not the $NH_3$ sensor has any abnormality if the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on a boundary of whether or not NOx is produced by the ammonia oxidation catalyst.

6. The abnormality judging system for the exhaust gas purification apparatus of the internal combustion engine according to claim 3, wherein the judging unit judges whether or not the $NH_3$ sensor has any abnormality if:

the temperature acquired by the temperature acquiring unit is low and the amount of the exhaust gas acquired by the exhaust gas flow rate acquiring unit is large as compared with the temperature of the ammonia oxidation catalyst and the amount of the exhaust gas allowed to flow into the ammonia oxidation catalyst to be provided on a boundary of whether or not NOx is produced by the ammonia oxidation catalyst; and the temperature acquired by the temperature acquiring unit is low and the amount of the exhaust gas acquired by the exhaust gas flow rate acquiring unit is large as compared with temperature of the ammonia oxidation catalyst and the amount of the exhaust gas allowed to flow into the ammonia oxidation catalyst to be provided on a boundary of whether or not $NH_3$ flows out from the ammonia oxidation catalyst.

* * * * *